J. L. POLLOCK.
LATCH.
APPLICATION FILED FEB. 28, 1920.

1,415,192.

Patented May 9, 1922.
3 SHEETS—SHEET 1.

INVENTOR.
John Louis Pollock.
BY Walter N. Haskell.
his ATTORNEY.

J. L. POLLOCK.
LATCH.
APPLICATION FILED FEB. 28, 1920.

1,415,192.

Patented May 9, 1922.
3 SHEETS—SHEET 2.

INVENTOR.
John Louis Pollock,
BY Walter N. Haskell.
his ATTORNEYS.

J. L. POLLOCK.
LATCH.
APPLICATION FILED FEB. 28, 1920.
1,415,192. Patented May 9, 1922.
3 SHEETS—SHEET 3.
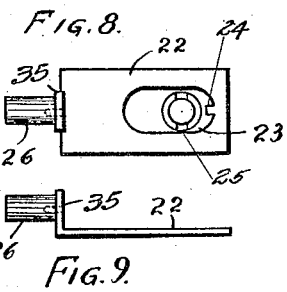
Fig. 8.
Fig. 9.
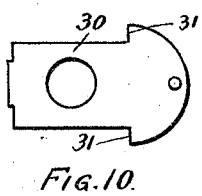
Fig. 10.
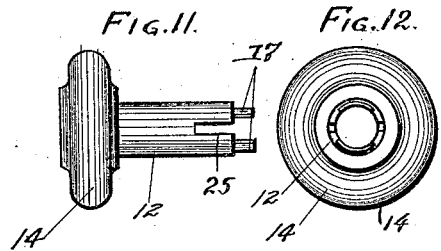
Fig. 11. Fig. 12.
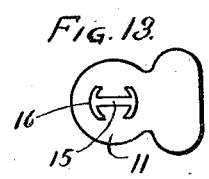
Fig. 13.
Fig. 14.
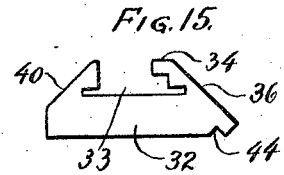
Fig. 15.
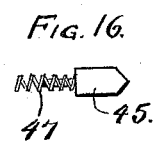
Fig. 16.
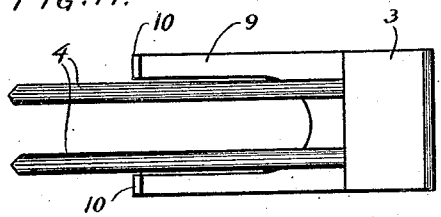
Fig. 17.
Fig. 18.
Fig. 19.
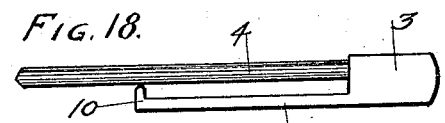
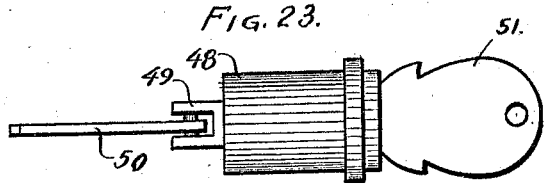
Fig. 23.
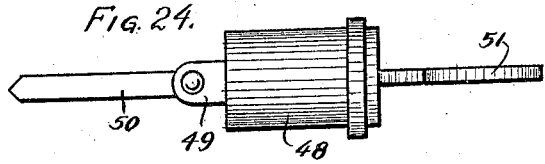
Fig. 24.
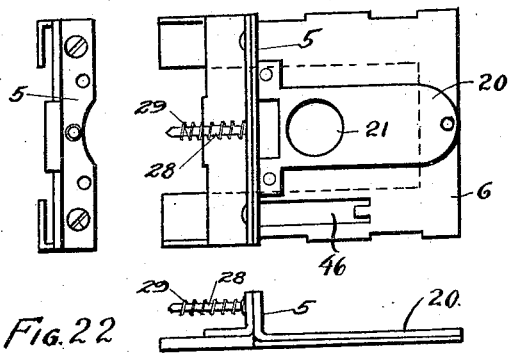
Fig. 21. Fig. 20.
Fig. 22.
INVENTOR.
John Louis Pollock
BY Walter N. Haskell.
his ATTORNEYS.

UNITED STATES PATENT OFFICE.

JOHN LOUIS POLLOCK, OF FREEPORT, ILLINOIS, ASSIGNOR OF ONE-THIRD TO ALLAN J. HEAD, OF STERLING, ILLINOIS, AND ONE-THIRD TO THOMAS G. STEWART, OF HIGHLAND PARK, MICHIGAN.

LATCH.

1,415,192.   Specification of Letters Patent.   Patented May 9, 1922.

Application filed February 28, 1920. Serial No. 361,962.

*To all whom it may concern:*

Be it known that I, JOHN LOUIS POLLOCK, a citizen of the United States, residing at Freeport, in the county of Stephenson and State of Illinois, have invented certain new and useful Improvements in Latches, of which the following is a specification.

My invention has reference to latches, and more particularly to what are known as "night latches" which can be released from a locking position from the outside of the door by means of a suitable key, and which will automatically lock the door upon the same being closed.

One of the purposes of the invention is to provide novel mechanism by means of which the latch can be held in withdrawn position, so that there will be no hindrance therefrom in opening and closing the door. This feature is desirable in latches on the doors of banks, stores, offices and similar places, which are in use during a good part of the day.

Another purpose of the invention is to provide means for preventing the operation of the above mentioned devices, when it is desired to have the latch return automatically to a locking position, as after it has been actuated by a key from the outside, or by a knob or handle on the inside of the door.

The parts of my invention are simple and effective in operation, and can be contained within a limited space. They are also entirely enclosed and concealed, thereby adding to the general appearance of the latch.

The construction, arrangement and operation of the various parts of the device will more fully appear from the following specification, reference being had to the drawings accompanying the same, in which the preferred embodiment of the invention is disclosed. In said drawings:

Fig. 8 is a plan view of the plate 22.

Fig. 9 is a side view of said plate.

Fig. 10 is a plan view of the plate 30.

Figs. 11 and 12 are side and end views, respectively, of the knob 14.

Fig. 13 is a plan view of the plate 11.

Fig. 14 shows the switch-key 37, detached.

Fig. 15 is a detached view of the slide-plate 32.

Fig. 16 is a detail of the pin 45.

Fig. 17 is a plan view of the latch 3.

Fig. 18 is a side view thereof.

Fig. 19 is a detail of one of the springs 8.

Fig. 20 shows the plate 6 and appurtenant parts, detached.

Fig. 21 is an end view thereof.

Fig. 22 is a side view of the same.

Figs. 23 and 24 show a form of lock device, to be used in connection with my invention, in two different positions.

Figure 1:
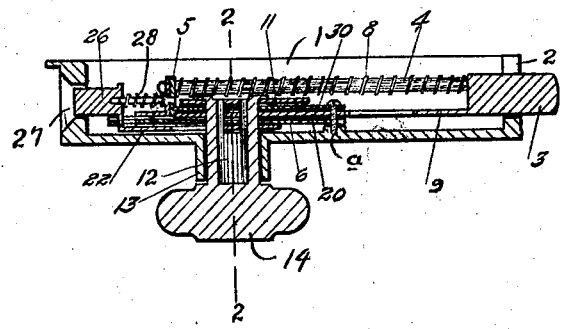
Fig. 1 shows the invention in longitudinal, medial section.
Figure 2:
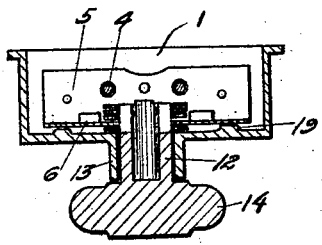
Fig. 2 is a cross-section, on the broken line 2—2 of Fig. 1.
Figure 3:
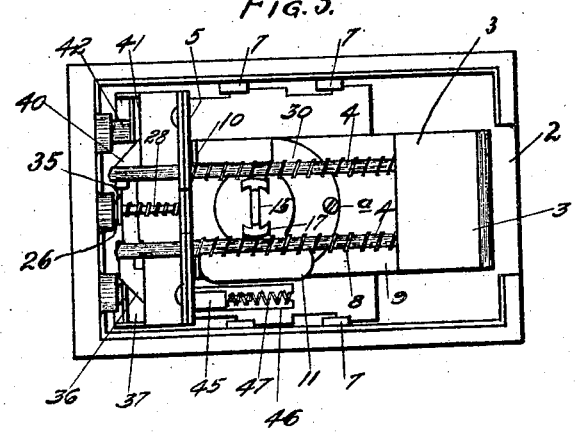
Fig. 3 is an inner plan view of the invention, with the latch in withdrawn position.
Figure 4:
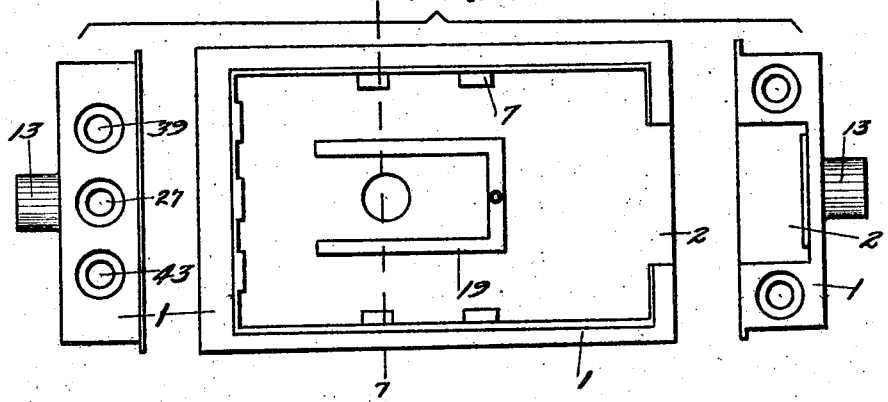
Fig. 4 is an inner plan view of the casing 1, with the ends thereof shown in projection.
Figure 5:
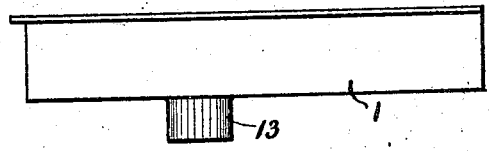
Fig. 5 is a side view of the casing 1.
Figure 6:
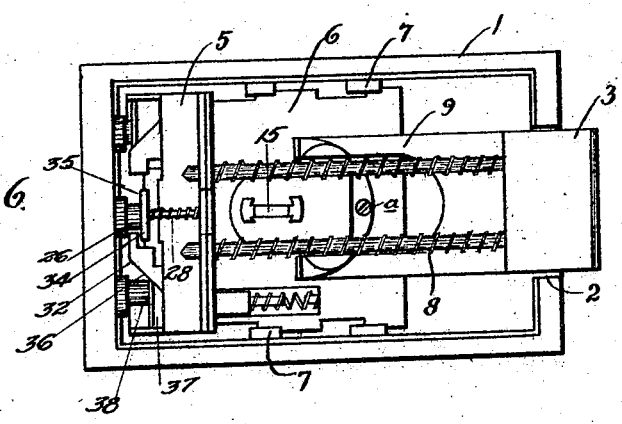
Fig. 6 is an inner plan view of the invention, with the latch in thrown position.
Figure 7:
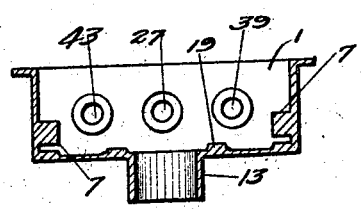
Fig. 7 is a cross-section of the casing, on the broken line 7—7 of Fig. 4.

1 represents a casing of usual form, having at one end an opening 2, in which is movable a latch 3, to which is secured a pair of rods 4, slidable in openings in a cross-plate 5, attached to a plate 6. The plate 6 is adapted to be slipped beneath projections 7 at the sides of the casing 1, and is held in place by means of a screw, as at *a*. By means of coiled springs 8 on the rods 4 the latch 3 is held normally in a projected position.

The latch 3 is also provided with a pair of arms 9, fitted at their ends with lugs 10, which are adapted to be engaged by a cam-plate 11, secured to the inner end of a shank 12, rotatable in a bearing 13, and having upon its outer end a knob 14. Centrally of the plate 11 is a slot 15, having at its ends transverse extensions 16, which are designed to receive points 17 on the end of the shank 12, such points being upset against the face of the plate, to secure the shank and plate together.

On the inner face of the casing 1 is a rib 19, upon which the plate 6 rests, and above said plate is a guide-plate 20, also held in place by the screw *a*, and provided with an upturned flange to which the plate 5 is attached. The edges of the plate 20 form guides for the arms 9 in the movement of the latch 3. Said plate is provided with an opening 21 for the passage of the shank 12.

Having longitudinal play in the space within the rib 19 is a plate 22, in which is an opening 23, through which the shank 12 freely passes. In one end of the opening 23 is a lug 24, adapted for engagement with one or other of a pair of slots 25 in the shank 12. At the opposite end the plate 22 is provided with a pin 26, slidable in an opening 27 in the end of the casing 1. Held on a pin 28 projecting from the cross-plate 5 is a coiled spring 29, the end of which bears against the pin 26, and tends to hold the lug 24 in contact with the shank 12, and cause it to enter one or other of the slots 25 when the shank is in a proper position therefor. The engagement of such lug and slot thereupon holds said shank from rotation, and locks the parts with the latch 3 withdrawn.

Fixed in place above the guide-plate 20 is a plate 30, having extensions 31 beneath which the arms 9 travel, said arms being held by said extensions from movement away from the plate 6. The shoulders on said extensions also act as stops for said arms, limiting the movement thereof, and consequently of the latch 3, outwardly.

In the normal position of the device, with the latch 3 extended, the slots 25 are at right angles with the slot 11, but upon the knob 14 being given a quarter turn in either direction, one or other of the slots 25 is brought into position to receive the lug 24, which engages therewith, as above stated. By pushing the pin 26 inwardly the lug is disengaged from the shank, and the springs 8 cause the latch 3, and knob 14, to return to their former positions. It is sometimes desired, however, to have the mechanism set so that the lug will not engage with the shank upon such shank being turned, in which case the latch will immediately return to a locking position upon the knob being released. In order to accomplish this I provide the following devices:—
A plate 32 is slidable transversely of the casing, in the end thereof opposite to the latch 3, such plate being provided with a recess 33, at one side of which is a projection 34, adapted to engage a collar 35 on the pin 26. If the pin 26 is pushed inwardly the projection 34 engages the collar on the outer side, holding the pin 26 and plate 22 from engagement, and permitting the shank 12 to be turned freely in either direction. The plate 32 is moved, to cause the engagement of the projection 34 with the collar 35 by means of a beveled edge 36 on the plate 32, actuated by a switch-key 37, provided with a pin 38, movable in an opening 39 in the end of the casing. By forcing the pin 38 inwardly the plate 32 is moved to cause such engagement of the projection and collar. The opposite end of the plate 32 is provided with an oppositely beveled edge 40, engaged by a switch-key 41, provided with a pin 42 in an opening 43 in the end of the casing. Upon pushing the pin 42 inwardly the plate 32 is forced back to its normal position.

If it is desired to hold the latch 3 in a withdrawn position, so that the door can be opened and closed without hindrance therefrom, the knob 14 is turned in one direction or the other until the lug 24 engages one of the slots 25. The pin 38 is then pushed inwardly, forcing the plate 32 into position with the projection 34 on the inner side of the collar 35, thus retaining the parts in position with the knob turned and latch withdrawn. To release from this position the pin 42 is actuated, as above set forth.

Accidental movement of the plate 32 is prevented by means of a notch 44 in the edge of such plate, engaged by a friction pin 45, movable in an opening 46 in the plate 6, and held in engagement with the plate 32 by a coiled spring 47.

In the arrangement herein shown and set forth, the knob 14 is necessarily on the inside of the door, but in order that the latch can be operated from the outside of the door a lock of any usual construction can be provided, with connections with the latch operating devices. As one mode of doing this I have illustrated a lock 48 of conventional form, adapted for being seated in a door adjacent to the latch. In the inner end of such lock is rotatably mounted a coupling 49, from which a pin 50 extends into the latch casing, so as to engage the slot 15 of the cam-plate 11. A key 51 is also represented, and when such key is so constructed as to enter the lock and connect with the coupling 49, such coupling and the pin 50 can be rotated so as to turn the plate 11 and withdraw the latch.

What I claim and desire to secure, is:—

1. A device of the class described, comprising a casing; a latch slidable therein; a knob member rotatably mounted in said casing, and provided with latch-operating devices; a slide-plate provided with means for engagement with said knob member, to hold said latch in withdrawn position; means for operating said plate from without the casing; and means for holding said plate releasably in engagement with said knob member.

2. A device of the class described, comprising a casing; a latch slidable therein, and provided with means for holding the same normally in extended position; a knob member, rotatable in said casing, provided with a latch-operating cam, and having catch-engaging slots; a plate slidable in said casing and provided with a catch adapted for alternate engagement with said slots; a push-pin connected with said plate, and seated in an opening in the end of said casing; and a spring acting on said plate to compel the engagement of said catch and slot.

3. A device of the class described, comprising a casing; a latch slidable therein, and provided with means for holding the same normally in extended position; a knob member, rotatable in said casing, provided with a latch-operating cam, and having catch engaging slots; a plate slidable in said casing and provided with a catch adapted for alternative engagement with said slots; a push-pin mounted in the end of said casing, and operatively connected with said plate.

4. A device of the class described, comprising a casing; a spring controlled latch slidable therein; a knob member, rotatable in said casing, provided with a latch-operating cam, and fitted with a pair of catch-engaging slots; a plate slidable in said casing and provided with a catch adapted for alternative engagement with said slots; means for actuating said plate from outside the casing; a lock-plate slidable transversely of said first-named plate, and adapted to hold the same in position with the catch thereon disengaged; a push-pin mounted in the end of said casing, and operatively connected with said lock-plate, to move it into a locking position; and means for returning said lock-plate to an unlocking position.

5. A device of the class described, comprising a casing; a latch slidable therein; a knob member, rotatable in said casing, operatively connected with said latch, and fitted with catch-engaging slots; a spring-controlled catch-plate slidable in said casing, and provided with a push-pin mounted in the end of the casing; said plate being adapted for alternative engagement with said slots; a lock-plate slidable transversely of said first-named plate, and adapted to hold the same in position out of engagement with said knob member; a push-pin mounted in the end of said casing, operatively associated with said catch-plate to lock the same in disengaged position; and a push-pin, also mounted in the end of said casing, and adapted to return said locking-plate to a normal position, disengaged from said catch-plate.

6. A device of the class described, comprising a casing; a knob member, rotatively mounted in said casing, and fitted with a pair of catch-engaging slots; a spring-controlled latch operatively connected with said knob member; a plate slidable in said casing, and provided with a catch adapted for alternative engagement with said slots; means for suitably actuating said plate to release the same from engagement with said knob-member; a lock-plate slidable transversely of said first-named plate, capable of holding the same in a disengaged position; means for throwing said lock-plate into a locking position; means for releasing said lock-plate from a locking position; a locking device, adapted for mounting in a door adjacent to said casing; and a key extension connecting said locking device with said knob member, so as to communicate movement thereto.

In testimony whereof I affix my signature.
JOHN LOUIS POLLOCK.